(12) United States Patent
Baldemair et al.

(10) Patent No.: US 12,490,245 B2
(45) Date of Patent: *Dec. 2, 2025

(54) PHYSICAL SHARED CHANNEL SPLITTING AT SLOT BOUNDARIES

(71) Applicant: Telefonaktiebolaget LM Ericsson (publ), Stockholm (SE)

(72) Inventors: Robert Baldemair, Solna (SE); Mattias Andersson, Sundbyberg (SE); Kittipong Kittichokechai, Järfälla (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/668,906

(22) Filed: May 20, 2024

(65) Prior Publication Data

US 2024/0306131 A1    Sep. 12, 2024

Related U.S. Application Data

(63) Continuation of application No. 17/267,614, filed as application No. PCT/EP2019/071447 on Aug. 9, 2019, now Pat. No. 12,016,000.

(Continued)

(51) Int. Cl.
 *H04W 72/21*  (2023.01)
 *H04L 5/00*   (2006.01)
 *H04W 72/0446* (2023.01)

(52) U.S. Cl.
 CPC ....... *H04W 72/0446* (2013.01); *H04L 5/0048* (2013.01); *H04W 72/21* (2023.01)

(58) Field of Classification Search
 CPC ................................................ H04W 72/21
 (Continued)

(56) References Cited

U.S. PATENT DOCUMENTS

2008/0089286 A1    4/2008   Malladi et al.
2014/0153528 A1    6/2014   Chen et al.
(Continued)

FOREIGN PATENT DOCUMENTS

CN    1764307 A      4/2006
CN    101490980 A    7/2009
(Continued)

OTHER PUBLICATIONS

International Search Report and Written Opinion dated Oct. 30, 2019 for International Application No. PCT/ EP2019/071447 filed on Aug. 9, 2019, consisting of 9—pages.
(Continued)

*Primary Examiner* — Angel T Brockman
(74) *Attorney, Agent, or Firm* — Weisberg I.P. Law, P.A.

(57) ABSTRACT

A method, system and apparatus are disclosed. A network node configured to communicate with a wireless device (WD) is provided. The network node includes processing circuitry configured to cause the network node to: indicate a splitting of an initial physical shared channel allocation that crosses a slot boundary into at least a first physical shared channel allocation in a first slot and a second physical shared channel allocation in a second slot; and communicate with the wireless device, WD, according to the at least the first physical shared channel allocation and the second physical shared channel allocation.

20 Claims, 11 Drawing Sheets

Related U.S. Application Data

(60) Provisional application No. 62/717,544, filed on Aug. 10, 2018.

(58) Field of Classification Search
USPC .......................................................... 370/329
See application file for complete search history.

(56) References Cited

U.S. PATENT DOCUMENTS

| | | | |
|---|---|---|---|
| 2016/0182199 | A1 | 6/2016 | Webb et al. |
| 2017/0367046 | A1 | 12/2017 | Papasakellariou |
| 2018/0199359 | A1 | 7/2018 | Cao et al. |
| 2018/0255569 | A1 | 9/2018 | Aiba et al. |
| 2021/0329632 | A1* | 10/2021 | Baldemair ............ H04L 5/0044 |
| 2022/0078785 | A1* | 3/2022 | Cariou .................. H04W 76/15 |

FOREIGN PATENT DOCUMENTS

| | | |
|---|---|---|
| CN | 103701564 A | 4/2014 |
| CN | 104918259 A | 9/2015 |
| WO | 2018129085 A1 | 7/2018 |

OTHER PUBLICATIONS

3GPP TS 38.214 V15.2.0; 3rd Generation Partnership Project; Technical Specification Group Radio Access Network; NR; Physical layer procedures for data (Release 15); Jun. 2018, consisting of 95—pages.
3GPP TSG RAN WG1 Meeting #93 R1-1805801; Title: Final Report of 3GPP TSG RAN WG1 #92bis v1.0.0 (Sanya, China, Apr. 16-20, 2018); Source: MCC Support; Document for: Approval; Location and Date: Busan, South Korea, May 21-25, 2018, consisting of 195—pages.
3GPP TSG-RAN#80 RP-181477; Title: New SID on Physical Layer Enhancements for NR URLLC; Source: Huawei, HiSilicon, Nokia, Nokia Shanghai Bell; Document for: Approval; Agenda Item: 9.1.9; Location and Date: La Jolla, USA, Jun. 11-14, 2018, consisting of 5—pages.
3GPP TSG-RAN WG1 Meeting #94 R1-1809040; Title: Latency Evaluation of Rel-15 URLLC; Agenda Item: 7.2.6.4; Source: Ericsson; Document for: Discussion, Decision; Location and Date: Gothenburg, Sweden, Aug. 20-24, 2018, consisting of 7—pages.
3GPP TSG-RAN WG1 Meeting #93 Tdoc R1-1807250; Title: On Improvements to the Search Space Design; Agenda Item: 7.1.3.1.5; Source: Ericsson; Document for: Discussion and Decision; Location and Date: Busan, Korea, May 21-25, 2018, consisting of 8—pages.
3GPP TSG RAN WG1 Meeting #91 R1-1719389; Title: DCI contents and formats in NR; Agenda Item: 7.3.1.4; Source: Huawei, HiSilicon; Document for: Discussion and decision; Location and Date: Reno, USA, Nov. 27-Dec. 1, 2017, consisting of 11—pages.
3GPP TSG RAN WG1 Meeting #92 R1-1802416; Title: Remaining issues of UL transmission procedures; Source: Intel Corporation; Agenda Item: 7.1.3.3.4; Document for: Discussion and Decision; Location and Date: Athens, Greece, Feb. 26-Mar. 2, 2018, consisting of 4—pages.
Indian Office Action dated Jan. 10, 2022 for Patent Application No. 202117004675, consisting of 5—pages.
Chinese Office Action and English Summary dated Aug. 9, 2023 for Application No. 201980066936.5, consisting of 11 pages.
Colombian Office Action and English Translation dated Nov. 22, 2023 for Application No. NC2021/0003105, consisting of 17 pages.
Colombian Office Action and English Translation dated Sep. 12, 2024, consisting of 19 pages.

* cited by examiner

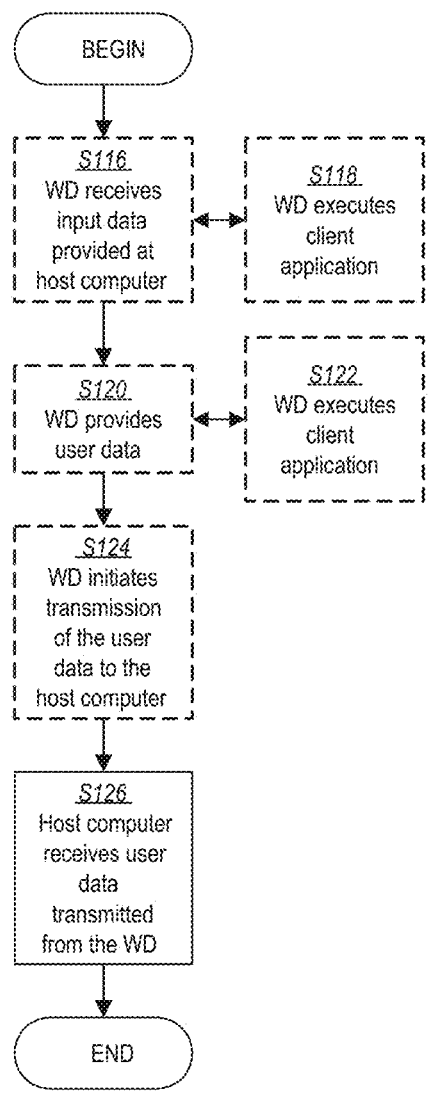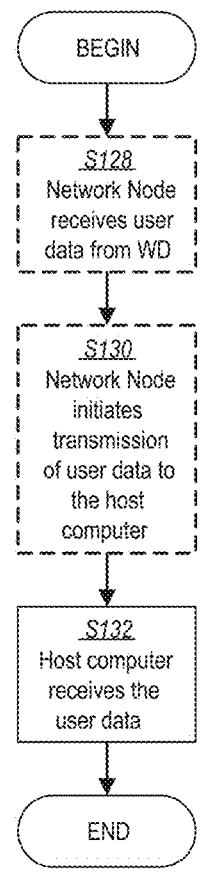
FIG. 7
FIG. 8

PHYSICAL SHARED CHANNEL SPLITTING AT SLOT BOUNDARIES

CROSS-REFERENCE TO RELATED APPLICATIONS

This application is a Continuation Application of U.S. application Ser. No. 17/267,614 filed Feb. 10, 2021, which is a U.S. National Stage Patent Application of International Application No.: PCT/EP2019/071447, filed Aug. 9, 2019 entitled "PHYSICAL SHARED CHANNEL SPLITTING AT SLOT BOUNDARIES," which claims priority to U.S. Provisional Application No. 62/717,544, filed Aug. 10, 2018, entitled "PHYSICAL UPLINK SHARED CHANNEL (PUSCH) SPLITTING AT SLOT BOUNDARIES," the entireties of all of which are incorporated herein by reference.

TECHNICAL FIELD

Wireless communication and in particular, to splitting of a physical shared channel allocation that crosses a slot boundary, thereby allowing for communications to be performed according to a split physical shared channel allocation.

BACKGROUND

"Critical" or a certain type of data transmissions refer to transmissions with a combined requirement of low latency and high reliability, such as a loss ratio of $10^{-5}$ within 1 millisecond. As used herein, "critical" may refer to one or more predefined types of data transmission. Typical use cases for these types of data transmissions are factory automation and power substation communication in smart grid. This is a part of the 5th Generation (5G) requirement by International Telecommunication Union (ITU) and is under-development in both long term evolution (LTE) and new radio (NR) using the name URLLC (Ultra Reliable and Low Latency Communication).

New tool-sets for scheduling methods have been developed or are under-development for these critical data transmissions. Non-slot based transmission with flexible time duration, i.e., mini-slot, and options of higher subcarrier spacing in NR and short-transmission time interval (sTTI) in LTE have been standardized to minimize the transmission duration. The wireless device processing time to generate acknowledgment (ACK)/negative-acknowledgement (NACK) for feedback can be very short such as only in a couple of orthogonal frequency division multiplexing (OFDM) symbols. These mechanisms aim to reduce latency as well as the round-trip time in hybrid automatic repeat request (HARQ) retransmission so that more transmissions can be made possible within the latency budget. The duration of mini-slot is flexible ranging, e.g., from 2 OFDM symbols to a slot-length, and a multiple-slot transmission can be scheduled for one transport block, in order to help provide a flexible and robust transmission. In addition, a non-slot based transmission can preempt an on-going slot-transmission so that additional resource(s) can be made available for critical data transmission.

In terms of latency, NR third generation partnership project (3GPP) Release (Rel.) 15 supports data transmission with shorter duration than a slot. Physical downlink shared channel (PDSCH)/physical uplink shared channel (PUSCH) mapping Type B allows a transmission to start in any symbol in a slot, which makes it preferable from a latency viewpoint. For PDSCH mapping Type B, transmission durations of 2, 4, and 7 symbols are supported, while for PUSCH mapping Type B all symbol durations up to 14 symbols are supported. These features serve as the key elements to enable low latency transmission required for URLLC.

However, there still exist some limitations in terms of scheduling flexibility in NR Rel. 15 to fully enable URLLC transmission. One example is the restriction on scheduling across the slot border. For URLLC services with strict latency budget, it may be highly desirable that data be transmitted as soon as possible. A situation may arise, for example, where UL data for an UL transmission is ready to be transmitted (after some processing time at the wireless device) in a symbol that is too close to the slot border. Since NR Rel. 15 does not allow transmissions to cross the slot border, the wireless device has to wait until the beginning of the next slot to transmit. This can lead to an increased latency which exceeds the allowed budget. As an example of this, FIG. 1, parts A and B, provide an illustration of high alignment delay when the arrival of data with 7 symbol duration is too close to the slot border. In the case of a 7 symbol transmission, this alignment delay will occur in 50% of UL transmissions assuming data arriving uniformly. FIG. 1, part A, shows UL data with 7-symbol duration that is ready to be transmitted at symbol #9 in a slot. It cannot be transmitted immediately since the transmission would cross the slot border which is not allowed in NR Re. 15. The UE waits to transmit at the beginning of the net slot (see FIG. 1, part B). FIG. 1, part B shows data ready to transmitted at symbol #9 in slot #1, but is delayed until the next slot to avoid slot border crossing.

An alternative to waiting until the next slot is to schedule multiple transmissions with shorter duration so that the transmission can start already in the present slot. Although NR Rel. 15 supports slot aggregation where a transmission can be repeated over multiple slots, there is a limitation that the transport block (TB) repetition in the next slots may need to have the same resource allocation as the transmission in the first slot. That is, repetition of short transmissions (less than 14 symbols) across multiple slots may have some gaps between them as is illustrated in the example of FIG. 2 for an illustration of mini-slot aggregation. FIG. 2 shows that scheduled/configured repetition of shorter transmissions allow transmission to start immediately in slot #1. Slot aggregation in NR Rel. 15 however restricts the TB repetition in multiple slots to follow the same allocation. Thus, there is a gap between two repetitions, which is not suitable for low latency use cases.

In NR Rel-15, the time allocation of a PUSCH transmission is indicated in downlink control information (DCI) or through a configured grant (such as via radio resource control (RRC) and/or DCI signalling) by the starting symbol S, and the length of the transmission L. S and L are either explicitly signaled, or signaled through a start and length indicator variable (SLIV) as described in 3GPP technical specification (TS) 38.214 version 15.2.0. If L plus S is larger than 14, the grant is not valid.

SUMMARY

Some embodiments advantageously provide methods, systems, wireless devices and network nodes for splitting of a physical shared channel allocation that crosses a slot boundary, thereby allowing for communications to be performed according to a split physical shared channel allocation.

A PUSCH with a time-domain allocation that stretches across a slot boundary is split into two PUSCHs. As used herein, splitting a physical shared channel such as a PUSCH may refer to splitting physical shared channel allocation or assignment.

According to one aspect of the present disclosure, a method implemented in a wireless device, WD, is provided. The method includes receiving an indication of an initial physical shared channel allocation. The method includes, based at least in part on the indication, splitting the initial physical shared channel allocation that crosses a slot boundary into at least a first physical shared channel allocation in a first slot and a second physical shared channel allocation in a second slot. The method includes communicating with a network node according to the at least the first physical shared channel allocation and the second physical shared channel allocation.

According to another aspect of the present disclosure, a method implemented in a wireless device, WD, is provided. The method includes receiving an indication of a splitting of an initial physical shared channel allocation that crosses a slot boundary into at least a first physical shared channel allocation in a first slot and a second physical shared channel allocation in a second slot. The method includes communicating with a network node according to the at least the first physical shared channel allocation and the second physical shared channel allocation.

In some embodiments of this aspect, the physical shared channel allocation is one of a physical uplink shared channel, PUSCH, allocation, a physical downlink shared channel, PDSCH, allocation, and a sidelink channel allocation. In some embodiments of this aspect, receiving the indication further comprises receiving the indication in Downlink Control Information, DCI. In some embodiments of this aspect, receiving the indication further comprises receiving the indication in a configured grant. In some embodiments of this aspect, receiving the indication further comprises receiving an indication of a starting symbol, S, and a length, L. In some embodiments of this aspect, S plus L is permitted to be larger than 14.

In some embodiments of this aspect, the method includes determining a reference signal position of at least one reference signal corresponding to at least one of the at least the first physical shared channel allocation and the second physical shared channel allocation. The reference signal position is based at least in part on at least one of: a length of the first physical shared channel allocation; a length of the second physical shared channel allocation; a Demodulation Reference Signal, DMRS, mapping type; and a configuration. In some embodiments of this aspect, data to be communicated according to the first physical shared channel allocation and data to be communicated according to the second physical shared channel allocation correspond to the same transport block, TB. In some embodiments of this aspect, data to be communicated according to the first physical shared channel allocation and data to be communicated according to the second physical shared channel allocation correspond to different transport blocks, TBs. In some embodiments of this aspect, the indication is an implicit indication.

According to another aspect of the present disclosure, a method implemented in a network node is provided. The method includes indicating an initial physical shared channel allocation, the initial physical shared channel allocation that crosses a slot boundary being split into at least a first physical shared channel allocation in a first slot and a second physical shared channel allocation in a second slot. The method includes communicating with a wireless device, WD, according to the at least the first physical shared channel allocation and the second physical shared channel allocation.

According to another aspect of the present disclosure, a method implemented in a network node is provided. The method includes indicating a splitting of an initial physical shared channel allocation that crosses a slot boundary into at least a first physical shared channel allocation in a first slot and a second physical shared channel allocation in a second slot. The method includes communicating with a wireless device, WD, according to the at least the first physical shared channel allocation and the second physical shared channel allocation.

In some embodiments of this aspect, the physical shared channel allocation is one of a physical uplink shared channel, PUSCH, allocation, a physical downlink shared channel, PDSCH, allocation, and a sidelink channel allocation. In some embodiments of this aspect, indicating further comprises indicating in Downlink Control Information, DCI. In some embodiments of this aspect, indicating further comprises indicating in a configured grant. In some embodiments of this aspect, indicating further comprises indicating a starting symbol, S, and a length, L. In some embodiments of this aspect, S plus L is permitted to be larger than 14.

In some embodiments of this aspect, the method further includes determining a reference signal position of at least one reference signal corresponding to at least one of the at least the first physical shared channel allocation and the second physical shared channel allocation. The reference signal position is based at least in part on at least one of: a length of the first physical shared channel allocation; a length of the second physical shared channel allocation; a Demodulation Reference Signal, DMRS, mapping type; and a configuration. In some embodiments of this aspect, data to be communicated according to the first physical shared channel allocation and data to be communicated according to the second physical shared channel allocation correspond to the same transport block, TB. In some embodiments of this aspect, data to be communicated according to the first physical shared channel allocation and data to be communicated according to the second physical shared channel allocation correspond to different transport blocks, TBs. In some embodiments of this aspect, the indication is an implicit indication.

According to another aspect of the present disclosure, a wireless device, WD, configured to communicate with a network node is provided. The WD includes processing circuitry. The processing circuitry is configured to cause the WD to receive an indication of an initial physical shared channel allocation. The processing circuitry is configured to cause the WD to, based at least in part on the indication, split the initial physical shared channel allocation that crosses a slot boundary into at least a first physical shared channel allocation in a first slot and a second physical shared channel allocation in a second slot. The processing circuitry is configured to cause the WD to communicate with the network node according to the at least the first physical shared channel allocation and the second physical shared channel allocation.

According to another aspect of the present disclosure, a wireless device, WD, configured to communicate with a network node is provided. The WD includes processing circuitry. The processing circuitry is configured to cause the WD to receive an indication of a splitting of an initial physical shared channel allocation that crosses a slot boundary into at least a first physical shared channel allocation in a first slot and a second physical shared channel allocation in a second slot. The processing circuitry is configured to cause the WD to communicate with the network node according to the at least the first physical shared channel allocation and the second physical shared channel allocation.

In some embodiments of this aspect, the physical shared channel allocation is one of a physical uplink shared channel, PUSCH, allocation, a physical downlink shared channel, PDSCH, allocation, and a sidelink channel allocation. In some embodiments of this aspect, the processing circuitry is further configured to cause the WD to receive the indication by being configured to cause the WD to receive the indication in Downlink Control Information, DCI. In some embodiments of this aspect, the processing circuitry is further configured to cause the WD to receive the indication by being configured to cause the WD to receive the indication in a configured grant. In some embodiments of this aspect, the processing circuitry is further configured to cause the WD to receive the indication by being configured to cause the WD to receive an indication of a starting symbol, S, and a length, L. In some embodiments of this aspect, S plus L is permitted to be larger than 14.

In some embodiments of this aspect, the processing circuitry is further configured to cause the WD to determine a reference signal position of at least one reference signal corresponding to at least one of the at least the first physical shared channel allocation and the second physical shared channel allocation, the reference signal position being based at least in part on at least one of: a length of the first physical shared channel allocation; a length of the second physical shared channel allocation; a Demodulation Reference Signal, DMRS, mapping type; and a configuration. In some embodiments of this aspect, data to be communicated according to the first physical shared channel allocation and data to be communicated according to the second physical shared channel allocation correspond to the same transport block, TB. In some embodiments of this aspect, data to be communicated according to the first physical shared channel allocation and data to be communicated according to the second physical shared channel allocation correspond to different transport blocks, TBs. In some embodiments of this aspect, the indication is an implicit indication.

According to yet another aspect of the present disclosure, a network node configured to communicate with a wireless device, WD, is provided. The network node includes processing circuitry. The processing circuitry is configured to cause the network node to indicate an initial physical shared channel allocation, the initial physical shared channel allocation that crosses a slot boundary being split into at least a first physical shared channel allocation in a first slot and a second physical shared channel allocation in a second slot. The processing circuitry is configured to cause the network node to communicate with the wireless device, WD, according to the at least the first physical shared channel allocation and the second physical shared channel allocation.

According to yet another aspect of the present disclosure, a network node configured to communicate with a wireless device, WD, is provided. The network node includes processing circuitry. The processing circuitry is configured to cause the network node to indicate a splitting of an initial physical shared channel allocation that crosses a slot boundary into at least a first physical shared channel allocation in a first slot and a second physical shared channel allocation in a second slot. The processing circuitry is configured to cause the network node to communicate with the wireless device, WD, according to the at least the first physical shared channel allocation and the second physical shared channel allocation.

In some embodiments of this aspect, the physical shared channel allocation is one of a physical uplink shared channel, PUSCH, allocation, a physical downlink shared channel, PDSCH, allocation, and a sidelink channel allocation. In some embodiments of this aspect, the processing circuitry is further configured to indicate by being configured to cause the network node to indicate in Downlink Control Information, DCI. In some embodiments of this aspect, the processing circuitry is further configured to indicate by being configured to cause the network node to indicate in a configured grant. In some embodiments of this aspect, the processing circuitry is further configured to indicate by being configured to cause the network node to indicate a starting symbol, S, and a length, L. In some embodiments of this aspect, S plus L is permitted to be larger than 14.

In some embodiments of this aspect, the processing circuitry is further configured to cause the network node to determine a reference signal position of at least one reference signal corresponding to at least one of the at least the first physical shared channel allocation and the second physical shared channel allocation, the reference signal position being based at least in part on at least one of: a length of the first physical shared channel allocation; a length of the second physical shared channel allocation; a Demodulation Reference Signal, DMRS, mapping type; and a configuration. In some embodiments of this aspect, data to be communicated according to the first physical shared channel allocation and data to be communicated according to the second physical shared channel allocation correspond to the same transport block, TB. In some embodiments of this aspect, data to be communicated according to the first physical shared channel allocation and data to be communicated according to the second physical shared channel allocation correspond to different transport blocks, TBs. In some embodiments of this aspect, the indication is an implicit indication.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flow chart illustrating exemplary methods implemented in a communication system including a host computer, a network node and a wireless device for receiving user data from the wireless device at a host computer according to some embodiments of the present disclosure;

FIG. 8 is a flow chart illustrating exemplary methods implemented in a communication system including a host computer, a network node and a wireless device for receiving user data at a host computer according to some embodiments of the present disclosure;

DETAILED DESCRIPTION

Figure 1:
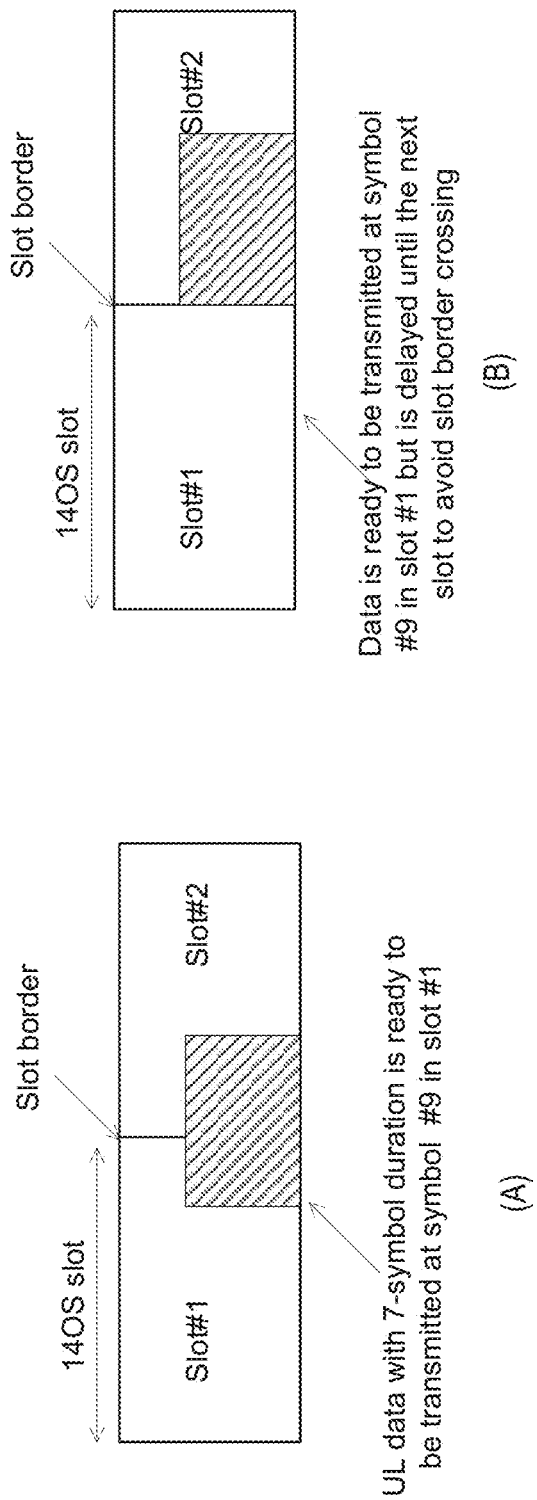
FIG. 1 includes diagrams of a high alignment delay due to transmission across slot border restriction.
Figure 2:
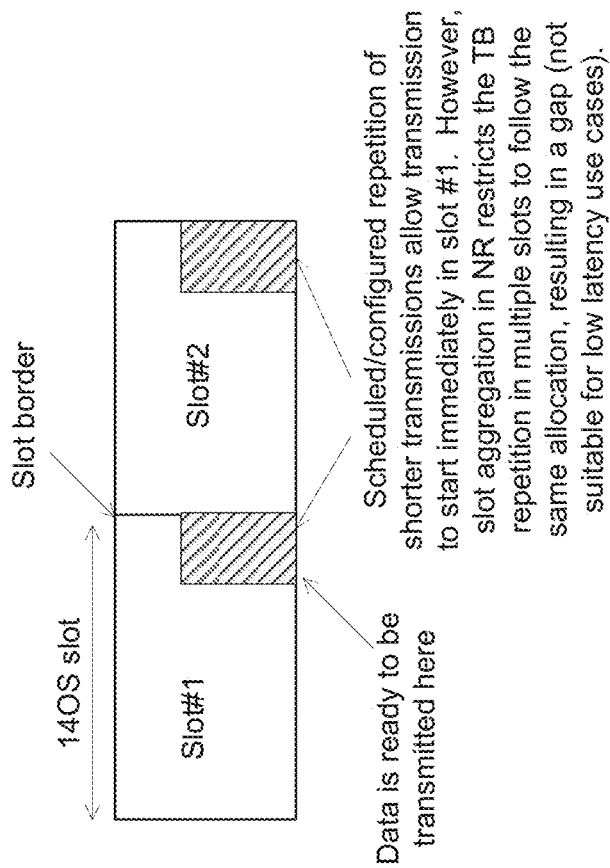
FIG. 2 is a diagram of a slot aggregation when applied to repetition of short transmissions.

As discussed above, transmissions crossing the slot boundary may present one or more issues or limitations in communications. One solution to this problem would be to allow transmissions to cross the slot boundary. However, this can be difficult to implement in practice, since this would result in slots possibly not being able to be processed independently by a receiver.

LTE defines sTTIs of length 2, 3, or 7 symbols. By repetition of sTTIs, with some STTIs in one subframe and some sTTIs in the next subframe, transmissions across slot boundaries can be achieved. This is however at the cost of extra signaling and worse performance due to additional demodulation reference signal (DMRS) overhead and/or lower coding gain coming from inefficient combining of several repetitions.

The disclosure solves at least a portion of the problems with existing systems by providing slot-oriented processing for the wireless device and also the network node, i.e., processing of PUSCH across slots is not easily compatible with existing hardware architecture, but the disclosure provides for avoidance of this boundary issue where a PUSCH crossing a slot boundary is split into two parts at the slot boundary. In other words, a PUSCH with a time-domain allocation that stretches across a slot boundary is split into two PUSCH. The teachings of the disclosure can be implemented, in one or more embodiments, with no extra signaling overhead.

Before describing in detail exemplary embodiments, it is noted that the embodiments reside primarily in combinations of apparatus components and processing steps related to splitting of a physical shared channel allocation that crosses a slot boundary, thereby allowing for communications to be performed according to a split physical shared channel allocation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station, gNB or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different time resources (e.g., TDD) and/or frequency resources, e.g., carriers and/or spectral bands. A cell may comprise at least one uplink carrier and at least one downlink carrier, which may have different frequency bands. A network node, e.g., a base station, gNB or eNodeB, may be adapted to provide and/or define and/or control one or more cells, e.g., a PCell and/or a SCell and/or a LA cell.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a wireless device may include sending allocation/configuration data to the wireless device indicating which modulation and/or encoding to use. A wireless device may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor or actuator equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB), Wireless Local Area Network (WLAN) 802.11 family and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for splitting of a physical shared channel allocation that crosses a slot boundary, thereby allowing for communications to be performed according to a split physical shared channel allocation.

Figure 3:
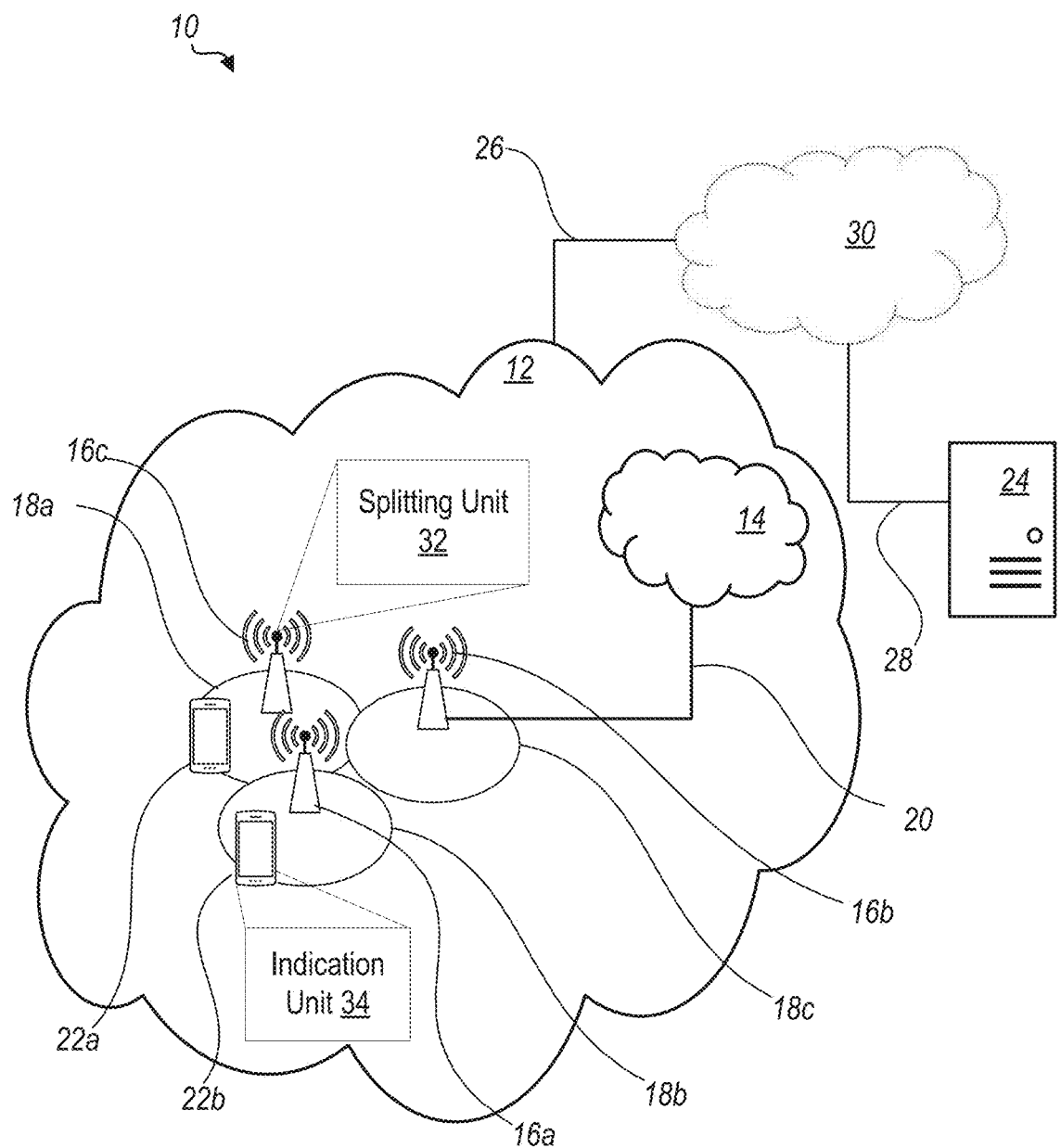
FIG. 3 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a splitting unit 32 which is configured to perform communications according to a split physical shared channel allocation. Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include an information unit 54 configured to enable the service provider to provide, receive and/or determine one or more indications and/or configurations for splitting a physical shared channel allocation that crosses a slot boundary.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include splitting unit 32 configured to perform communications according to a split physical shared channel allocation as described herein (such as the network node methods described with reference to, for example, FIG. 9).

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an indication unit 34 configured to perform communications according to a split physical shared channel allocation (such as the WD methods described with reference to, for example, FIG. 10).

Figure 4:
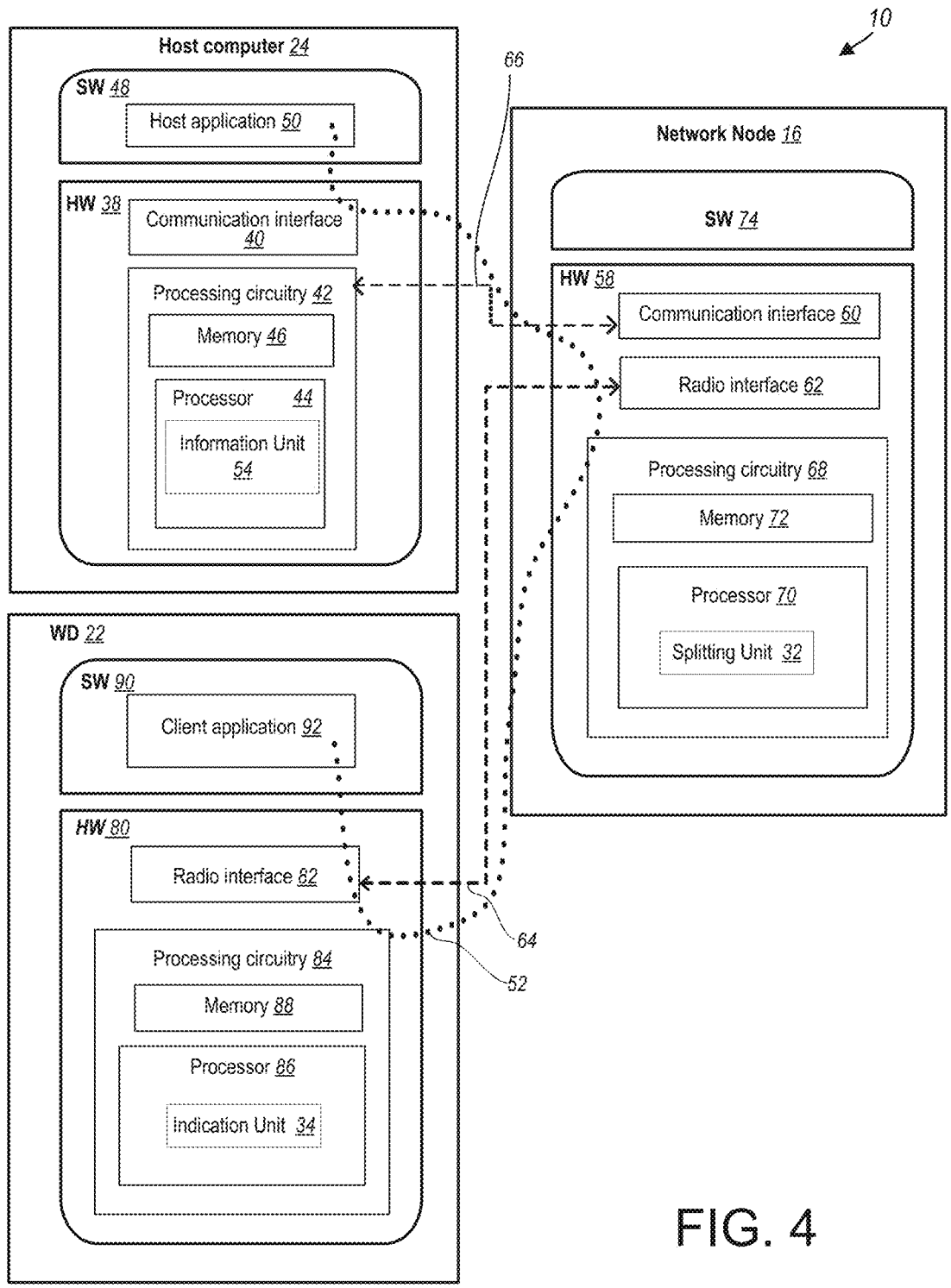
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as information unit 54, splitting unit 32 and indication unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 5, 6:
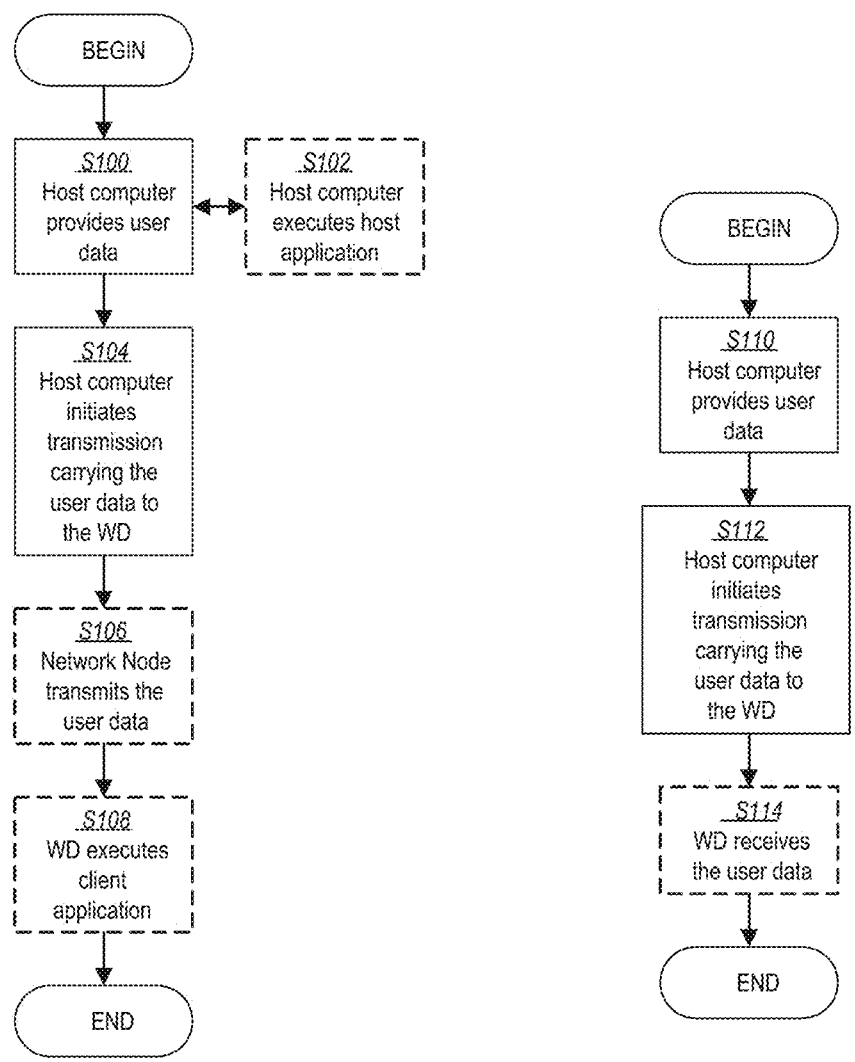
FIG. 5 is a flow chart illustrating exemplary methods implemented in a communication system including a host computer, a network node and a wireless device for executing a client application at a wireless device according to some embodiments of the present disclosure.
FIG. 6 is a flow chart illustrating exemplary methods implemented in a communication system including a host computer, a network node and a wireless device for receiving user data at a wireless device according to some embodiments of the present disclosure.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
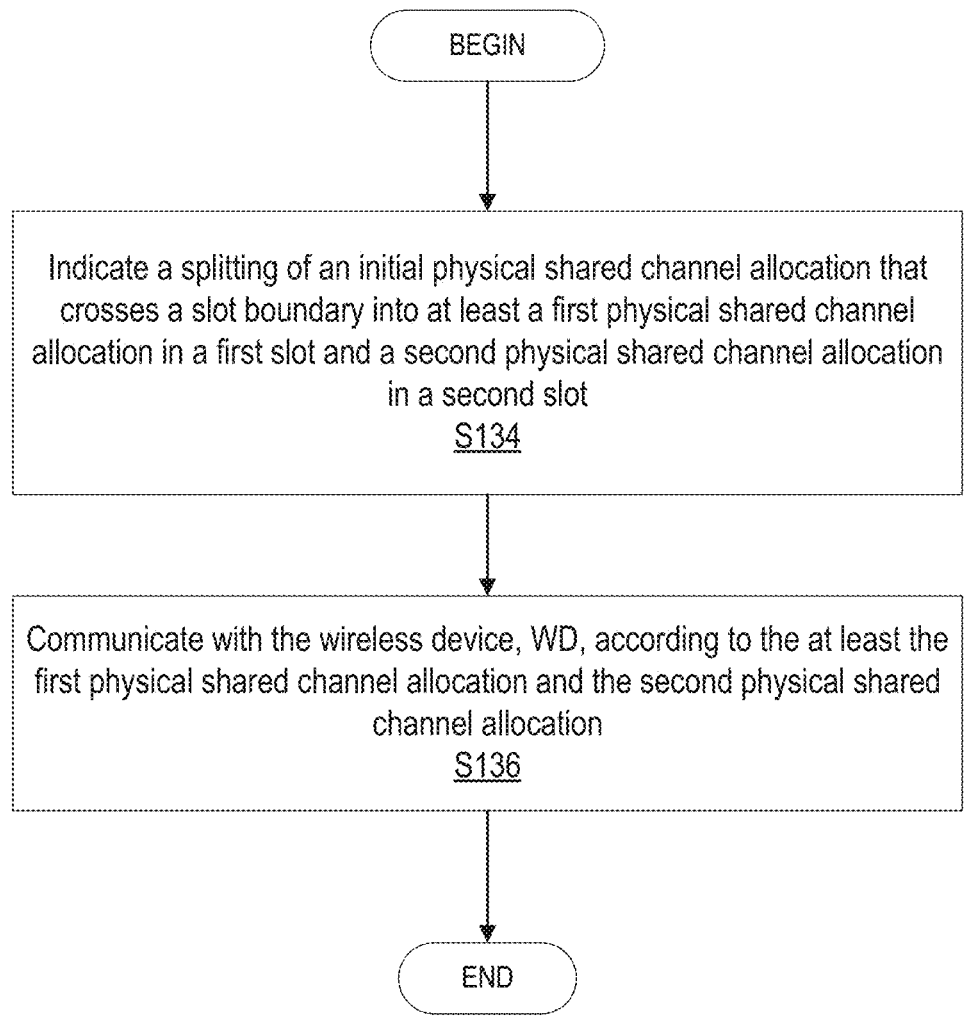
FIG. 9 is a flowchart of an exemplary process of splitting unit in a network node for performing communications according to a split physical shared channel allocation according to some embodiments of the present disclosure.

FIG. 9 is a flowchart of an exemplary process of splitting unit 32 in a network node 16 for performing communications according to a split physical shared channel allocation according to some embodiments of the present disclosure. One or more Blocks and/or functions and/or methods performed by the network node 16 may be performed by one or more elements of network node 16 such as by splitting unit 32 in processing circuitry 68, processor 70, radio interface 62, etc., according to the example method. The example method includes indicating (Block S134), such as by splitting unit 32, processing circuitry 68, processor 70 and/or radio interface 62, a splitting of an initial physical shared channel allocation that crosses a slot boundary into at least a first physical shared channel allocation in a first slot and a second physical shared channel allocation in a second slot. The method includes communicating (Block S136), such as by splitting unit 32, processing circuitry 68, processor 70 and/or radio interface 62, with a wireless device, WD 22, according to the at least the first physical shared channel allocation and the second physical shared channel allocation.

In some embodiments, the physical shared channel allocation is one of a physical uplink shared channel, PUSCH, allocation, a physical downlink shared channel, PDSCH, allocation, and a sidelink channel allocation. In some embodiments, indicating further comprises indicating in Downlink Control Information, DCI. In some embodiments, indicating further comprises indicating in a configured grant. In some embodiments, indicating further comprises indicating a starting symbol, S, and a length, L. In some embodiments, S plus L is permitted to be larger than 14. In some embodiments, the method further includes determining a reference signal position of at least one reference signal corresponding to at least one of the at least the first physical shared channel allocation and the second physical shared channel allocation. The reference signal position is based at least in part on at least one of: a length of the first physical shared channel allocation; a length of the second physical shared channel allocation; a Demodulation Reference Signal, DMRS, mapping type; and a configuration. In some embodiments, data to be communicated according to the first physical shared channel allocation and data to be communicated according to the second physical shared channel allocation correspond to the same transport block, TB. In some embodiments, data to be communicated according to the first physical shared channel allocation and data to be communicated according to the second physical shared channel allocation correspond to different transport blocks, TBs. In some embodiments, the indication is an implicit indication.

In some embodiments, processing circuitry 68 is configured to indicate a splitting of an initial physical shared channel allocation that crosses a slot boundary into at least a first physical shared channel allocation and second physical shared channel allocation. Processing circuitry 68 is configured to communicate with the wireless device according to the at least a first physical shared channel allocation and second physical shared channel allocation.

According to one or more embodiments, the physical shared channel allocation is a physical uplink shared channel allocation, sidelink channel allocation or a physical downlink shared channel allocation. According to one or more embodiments, a reference signal position of at least one reference signal in the initial physical shared channel allocation is in a different position in one of the two first and second physical shared channel allocations According to one or more embodiments, respective information bits of the initial physical shared channel allocation are distributed among the first and second physical shared channel allocations, the information bits in the first physical shared channel allocation being encoded independent of the information bits in the second physical shared channel allocation. In other embodiments, such as, for example, if the first and second channel corresponds to the same transport block, the same information bits are encoded twice, resulting in the first and second set of coded bits. The first and second set of coded bits are then transmitted in the first and second channel, respectively. Stated yet another way, in some embodiments, both channels correspond to the same set of information bits.

Figure 10:
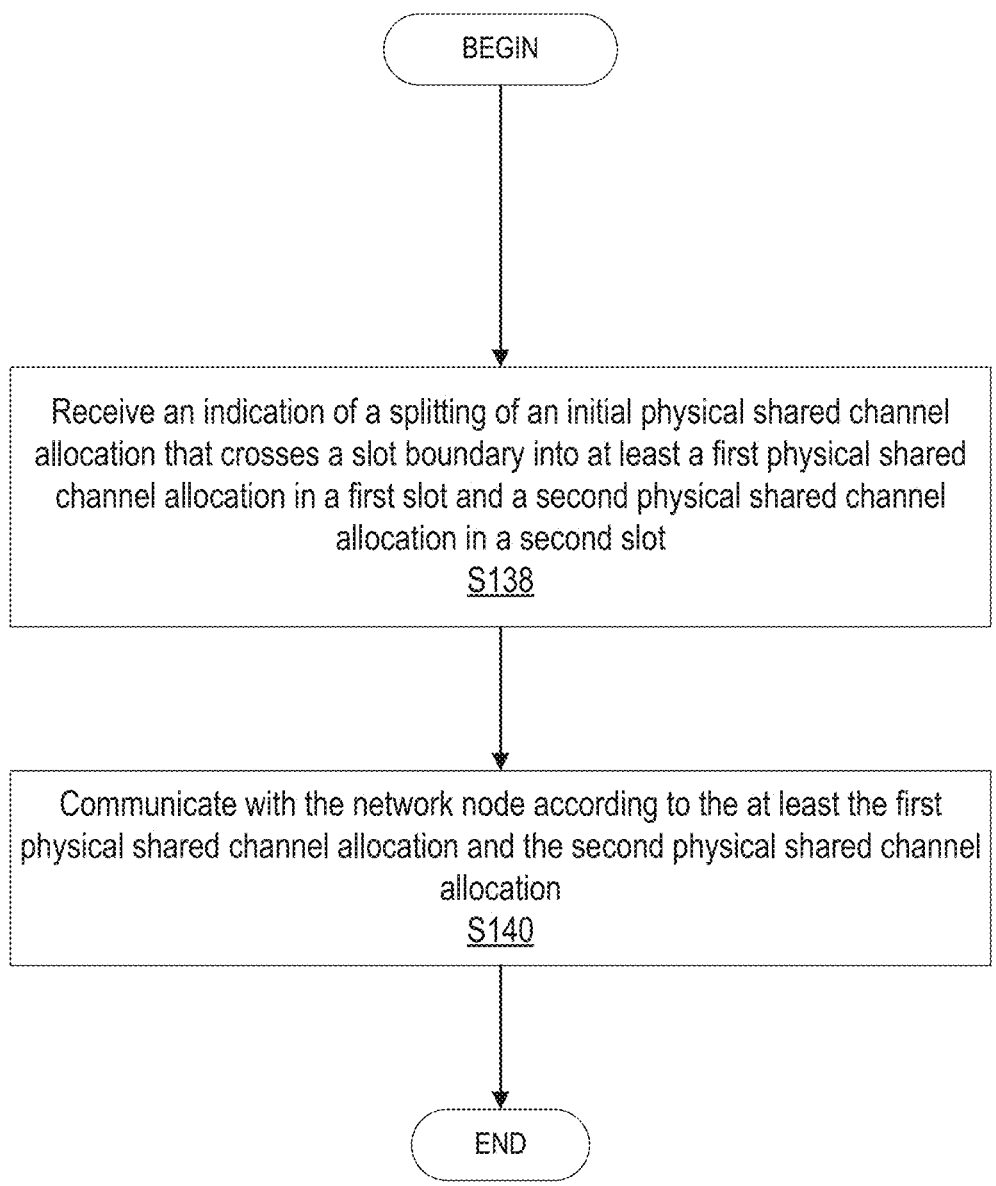
FIG. 10 is a flowchart of an exemplary process of an indication unit in a wireless device for performing communications according to a split physical shared channel allocation according to some embodiments of the present disclosure.

FIG. 10 is a flowchart of an exemplary process of indication unit 34 in a wireless device 22 for performing communications according to a split physical shared channel allocation according to some embodiments of the present disclosure. One or more Blocks and/or functions and/or methods performed by WD 22 may be performed by one or more elements of WD 22 such as by indication unit 34 in processing circuitry 84, processor 86, radio interface 82, etc. The example method includes receiving (Block S138), such as via indication unit 34, processing circuitry 84, processor 86 and/or radio interface 82, an indication of a splitting of an initial physical shared channel allocation that crosses a slot boundary into at least a first physical shared channel allocation in a first slot and a second physical shared channel allocation in a second slot. The method includes communicating (Block S140), such as via indication unit 34, processing circuitry 84, processor 86 and/or radio interface 82, with a network node 16 according to the at least the first physical shared channel allocation and the second physical shared channel allocation.

In some embodiments, the physical shared channel allocation is one of a physical uplink shared channel, PUSCH, allocation, a physical downlink shared channel, PDSCH, allocation, and a sidelink channel allocation. In some embodiments, receiving the indication further comprises receiving the indication in Downlink Control Information, DCI. In some embodiments, receiving the indication further comprises receiving the indication in a configured grant. In some embodiments, receiving the indication further comprises receiving an indication of a starting symbol, S, and a length, L. In some embodiments, S plus L is permitted to be larger than 14. In some embodiments, the method further includes determining a reference signal position of at least one reference signal corresponding to at least one of the at least the first physical shared channel allocation and the second physical shared channel allocation, the reference signal position being based at least in part on at least one of: a length of the first physical shared channel allocation; a length of the second physical shared channel allocation; a Demodulation Reference Signal, DMRS, mapping type; and a configuration. In some embodiments, data to be communicated according to the first physical shared channel allocation and data to be communicated according to the second physical shared channel allocation correspond to the same transport block, TB. In some embodiments, data to be communicated according to the first physical shared channel allocation and data to be communicated according to the second physical shared channel allocation correspond to different transport blocks, TBs. In some embodiments, the indication is an implicit indication.

In some embodiments, processing circuitry 84 is configured to receive an indication of a splitting of an initial physical shared channel allocation that crosses a slot boundary into at least a first physical shared channel allocation and second physical shared channel allocation. Processing circuitry 84 is configured to communicate with the network node according to the at least a first physical shared channel allocation and second physical shared channel allocation.

According to one or more embodiments, the physical shared channel allocation is a physical uplink shared channel allocation, sidelink channel allocation or a physical downlink shared channel allocation. According to one or more embodiments, a reference signal position of at least one reference signal in the initial physical shared channel allocation is in a different position in one of the two first and second physical shared channel allocations. According to one or more embodiments, respective information bits of the initial physical shared channel allocation are distributed among the first and second physical shared channel allocations, the information bits in the first physical shared channel allocation being encoded independent of the information bits in the second physical shared channel allocation. In other embodiments, such as, for example, if the first and second channel corresponds to the same transport block, the same information bits are encoded twice, resulting in the first and second set of coded bits. The first and second set of coded bits are then transmitted in the first and second channel, respectively. Stated yet another way, in some embodiments, both channels correspond to the same set of information bits.

Having generally described arrangements for splitting of a physical shared channel allocation that crosses a slot boundary, thereby allowing for communications to be performed according to a split physical shared channel allocation, details for these arrangements, functions and processes are provided as follows, and which may be implemented by the network node 16, wireless device 22 and/or host computer 24.

Figure 11:
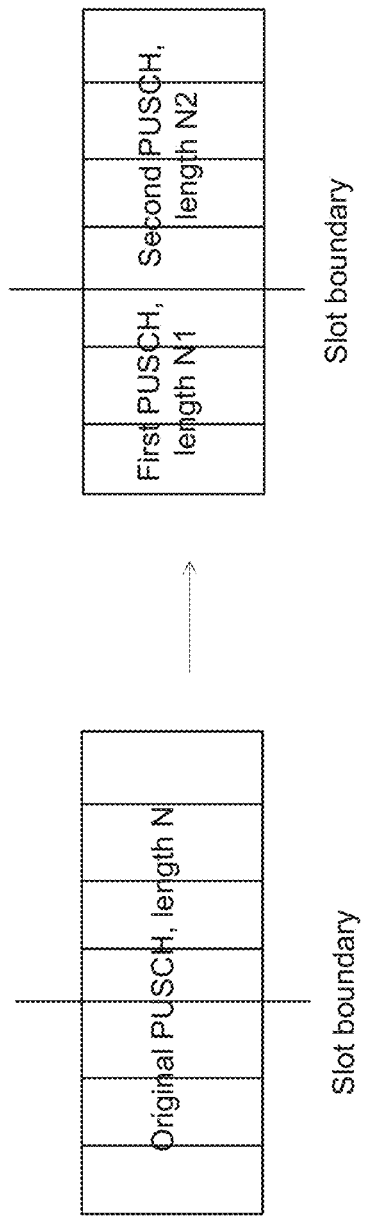
FIG. 11 is a PUSCH allocation crossing a slot boundary that is split into two PUSCHs in accordance with the principles of the disclosure.

A PUSCH allocation that stretches across a slot boundary is split into two PUSCH allocations, one in the first slot and one in the second slot as illustrated in FIG. 11. In one or more embodiment, the PUSCH allocation includes an allocation of symbols where this allocation of symbols is split into two allocation of symbols as described herein.

Determination of PUSCH Length in First and Second Slot

In one or more embodiments, the first PUSCH contains the original PUSCH symbols contained in the first slot and the second PUSCH contains the symbols contained in the second slot. In one or more embodiments, the length of first and second PUSCH is a function of the symbols of the original PUSCH in the first and second slot, respectively. Also, the original PUSCH length can be considered in this function. In one or more embodiments, first PUSCH refers to a first PUSCH allocation and a second PUSCH refers to a second PUSCH allocation.

For example, if there is only one symbol in the first slot, it could be that the first PUSCH length is set to zero (i.e., there is only a second PUSCH). The second PUSCH could in this case contain as many symbols as the original PUSCH contained in the second slot. Alternatively, to maintain the total PUSCH length, the second PUSCH has as many symbols as the original PUSCH (i.e. the PUSCH allocation is shifted into the next slot).

Reference Signals

The reference signal position (e.g., DM-RS or PT-RS) in the first and second PUSCH is determined based on the length of first and second PUSCH. NR defines (based on configuration) reference signal position for PUSCH that depend on the PUSCH length and the PUSCH DM-RS mapping type (Type A and Type B). Based on the length of the first and second PUSCH as well as on the indicated mapping type as well as on the configuration the existing NR rules can be reused to determine the reference signal positions. An original PUSCH starting late in a slot (and is thus split) uses likely Type B mapping. The first PUSCH can thus reuse Type B mapping. The second PUSCH can either use Type A or Type mapping (either configured or specified).

Figure 12:
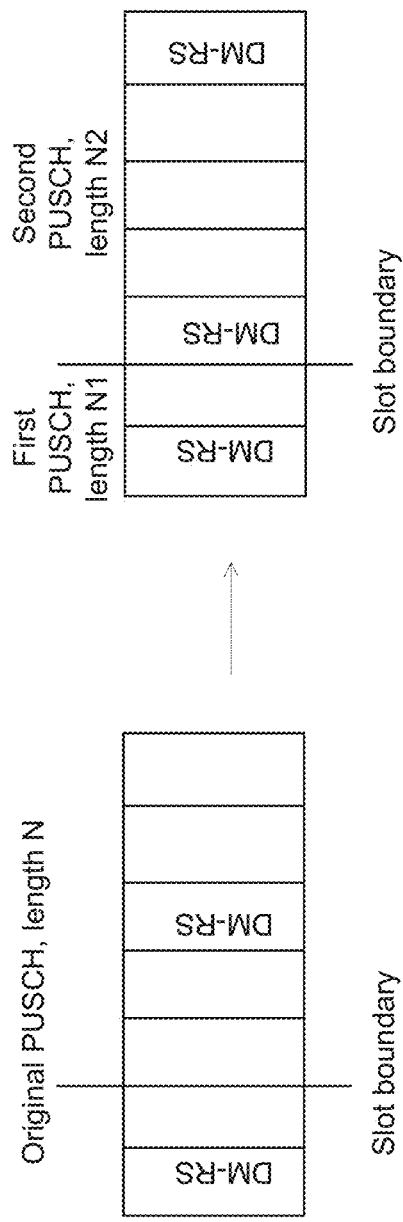
FIG. 12 is a diagram of an PUSCH that is configured to have a two reference signals where the PUSCH is split in accordance with the principles of the disclosure.

FIG. 12 illustrates the original PUSCH, i.e., initial PUSCH allocation, is configured to have 2 DM-RS. The DM-RS in first and second PUSCH are based on the configuration (2 DM-RS) as well as on the length of first and second PUSCH. Despite that 2 DM-RS are configured, existing NR rules determine that for a PUSCH of length 2 only 1 DM-RS is used, therefore the first PUSCH contains only 1 DM-RS. This setup can be used with and without frequency-hopping. Individual rectangles represent symbols.

The reference signal position can be determined based on the combined length of first and second PUSCH (or the length of the original PUSCH). Reference signal overhead can then be reduced compared to the case that reference signal position in each PUSCH would be based on the individual PUSCH lengths.

Figure 13:
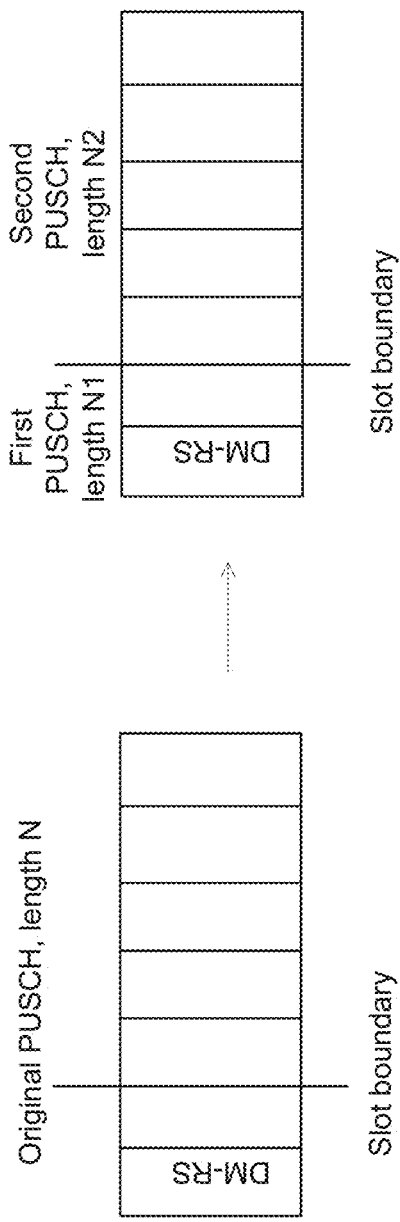
FIG. 13 is a diagram of a PUSCH that is configured to have one reference signal where the PUSCH is split in accordance with the principles of the disclosure.

FIG. 13 illustrates that the original PUSCH is configured to have 1 DM-RS. The DM-RS in first and second PUSCH are based on the configuration (1 DM-RS) as well as on the combined length of first and second PUSCH. Only 1 DM-RS may be used, the second PUSCH has no DM-RS. This setup may not be used for frequency-hopping. Individual rectangles represent symbols.

If first and second PUSCH apply frequency-hopping (i.e., first PUSCH uses not the same frequency-domain resources as the second PUSCH) reference signals in each PUSCH are needed. In this case it is preferable that the reference signal positions depend on the individual PUSCH length. (if the reference signal position depends on the combined length one must make sure for frequency-hopping that each PUSCH has a reference signal).

Encoding

The information bits of the shared data channel UL-SCH are encoded independently for each PUSCH. For each PUSCH, the information bits are concatenated with a CRC and encoded. Depending on the transmission strategy, the same or a different redundancy version of the coded bits is transmitted in the first PUSCH and second PUSCH. Which redundancy version (sequence) to use could be based on a rule and/or configured or indicated. An example of such a rule is that if the first PUSCH uses redundancy version 0 then the second PUSCH uses redundancy version 2, if the first PUSCH uses redundancy version 2 then the second PUSCH uses redundancy version 3, the first PUSCH uses redundancy version 3 then the second PUSCH uses redundancy version 1, and if the first PUSCH uses redundancy version 1 then the second PUSCH uses redundancy version 0.

In one or more embodiments, the PUSCH in the first and the second slot contain data corresponding to the same transport block (or blocks in the case of two codeword transmission), but they could also contain data from different transport blocks.

In some embodiments, such as, for example, if the first and second channel corresponds to the same transport block, the same information bits are encoded twice, resulting in the first and second set of coded bits. The first and second set of coded bits are then transmitted in the first and second channel, respectively. In some embodiments, both channels correspond to the same set of information bits.

Implementation and Signaling

A wireless device 22 implementing the split PUSCH may need to be configured accordingly (such as by removing the restriction that PUSCH cannot cross slot boundaries). If configured in that way, UE would perform PUSCH splitting. In one or more embodiments, no additional configurations are needed. It can be envisioned to fine tune the splitting by additional configurations, e.g. exactly how to determine the split length, the reference signal position, which redundancy version(s) to use.

One or more embodiments to implement the signaling allow grants with L+S larger than 14 as valid grants. When L+S is larger than 14, then the wireless device 22 performs PUSCH splitting. In some embodiments, if the first symbol in a slot is symbol 0, the last symbol in the slot may be symbol 13, therefore, in some embodiments, L+S may be considered larger than 13.

Configured Grant

The same method for PUSCH splitting can also be used for configured grants. If a configured grant has a time resource allocation crossing the slot boundary, the wireless device 22 would split the PUSCH into two parts, i.e., split the time resource allocation into two parts.

PDSCH

The same and/or similar methods can also be applied to PDSCH transmissions, perhaps with an offset in the start of the second PDSCH transmission to account for OFDM symbols used for physical downlink control channel (PDCCH).

In addition, some embodiments of the present disclosure may include one or more of the following:

Embodiment A1. A network node configured to communicate with a wireless device (WD), the network node configured to, and/or comprising a radio interface and/or comprising processing circuitry configured to:
  indicate a splitting of an initial physical shared channel allocation that crosses a slot boundary into at least a first physical shared channel allocation and second physical shared channel allocation; and
  communicate with the wireless device according to the at least a first physical shared channel allocation and second physical shared channel allocation.

Embodiment A2. The network node of Embodiment A1, wherein the physical shared channel allocation is a physical uplink shared channel allocation or a physical downlink shared channel allocation.

Embodiment A3. The network node of any one of Embodiments A1-A2, wherein a reference signal position of at least one reference signal in the initial physical shared channel allocation is in a different position in one of the two first and second physical shared channel allocations.

Embodiment A4. The network node of any one of Embodiments A1-A3, wherein respective information bits of the initial physical shared channel allocation are distributed among the first and second physical shared channel allocations, the information bits in the first physical shared channel allocation being encoded independent of the information bits in the second physical shared channel allocation.

Embodiment B1. A method implemented in a network node, the method comprising: indicating a splitting of an initial physical shared channel allocation that crosses a slot boundary into at least a first physical shared channel allocation and second physical shared channel allocation; and communicating with the wireless device according to the at least a first physical shared channel allocation and second physical shared channel allocation.

Embodiment B2. The method of Embodiment B1, wherein the physical shared channel allocation is a physical uplink shared channel allocation or a physical downlink shared channel allocation.

Embodiment B3. The method of any one of Embodiments B1-B2, wherein a reference signal position of at least one reference signal in the initial physical shared channel allocation is in a different position in one of the two first and second physical shared channel allocations.

Embodiment B4. The method of any one of Embodiments B1-B3, wherein respective information bits of the initial physical shared channel allocation are distributed among the first and second physical shared channel allocations, the information bits in the first physical shared channel allocation being encoded independent of the information bits in the second physical shared channel allocation.

Embodiment C1. A wireless device (WD) configured to communicate with a network node, the WD configured to, and/or comprising a radio interface and/or processing circuitry configured to:
  receive an indication of a splitting of an initial physical shared channel allocation that crosses a slot boundary into at least a first physical shared channel allocation and second physical shared channel allocation; and
  communicate with the network node according to the at least a first physical shared channel allocation and second physical shared channel allocation.

Embodiment C2. The WD of Embodiment C1, wherein the physical shared channel allocation is a physical uplink shared channel allocation or a physical downlink shared channel allocation.

Embodiment C3. The WD of any one of Embodiments C1-C2, wherein a reference signal position of at least one reference signal in the initial physical shared channel allocation is in a different position in one of the two first and second physical shared channel allocations.

Embodiment C4. The WD of any one of Embodiments C1-C3, wherein respective information bits of the initial physical shared channel allocation are distributed among the first and second physical shared channel allocations, the information bits in the first physical shared channel allocation being encoded independent of the information bits in the second physical shared channel allocation.

Embodiment D1. A method implemented in a wireless device (WD), the method comprising:
  receiving an indication of a splitting of an initial physical shared channel allocation that crosses a slot boundary into at least a first physical shared channel allocation and second physical shared channel allocation; and
  communicating with the network node according to the at least a first physical shared channel allocation and second physical shared channel allocation.

Embodiment D2. The method of Embodiment D1, wherein the physical shared channel allocation is a physical uplink shared channel allocation or a physical downlink shared channel allocation.

Embodiment D3. The method of any one of Embodiments D1-D2, wherein a reference signal position of at least one reference signal in the initial physical shared channel allocation is in a different position in one of the two first and second physical shared channel allocations.

Embodiment D4. The method of any one of Embodiments D1-D3, wherein respective information bits of the initial physical shared channel allocation are distributed among the first and second physical shared channel allocations, the information bits in the first physical shared channel allocation being encoded independent of the information bits in the second physical shared channel allocation.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| DM-RS | Demodulation Reference Signal |
| PT-RS | Phase Tracking Reference Signals |
| PUSCH | Physical Uplink Shared Channel |
| UL-SCH | Uplink-Shared |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, WD, configured to communicate with a network node, the method comprising:
receiving an indication of a splitting of an initial physical uplink shared channel, PUSCH, allocation that crosses a slot boundary into at least a first PUSCH allocation in a first slot and a second PUSCH allocation in a second slot;
communicating with the network node according to the at least first PUSCH allocation and the at least second PUSCH allocation; and
determining a reference signal position of at least one reference signal corresponding to at least one of the at least first PUSCH allocation and the at least second PUSCH allocation, the reference signal position being based at least in part on:
a length of the first PUSCH allocation;
a length of the second PUSCH allocation; and
a Demodulation Reference Signal, DMRS, mapping type.

2. The method of claim 1, wherein receiving the indication further comprises receiving an indication of a starting symbol, S, and a length, L, and wherein S plus L is permitted to be larger than 14.

3. A method implemented in a network node configured to communicate with a wireless device, WD, the method comprising:
indicating a splitting of an initial physical uplink shared channel, PUSCH, allocation that crosses a slot boundary into at least a first PUSCH allocation in a first slot and a second PUSCH allocation in a second slot;
communicating with the WD according to the at least first PUSCH allocation and according to the at least second PUSCH allocation; and
determining a reference signal position of at least one reference signal corresponding to at least one of the at least first PUSCH allocation and the at least second PUSCH allocation, the reference signal position being based at least in part on:
a length of the first PUSCH allocation;
a length of the second PUSCH allocation; and
a Demodulation Reference Signal, DMRS, mapping type.

4. The method of claim 3, wherein indicating further comprises indicating a starting symbol, S, and a length, L, and wherein S plus L is permitted to be larger than 14.

5. A wireless device, WD, configured to communicate with a network node, the WD comprising processing circuitry, the processing circuitry configured to cause the WD to:
receive an indication of a splitting of an initial physical uplink shared channel, PUSCH, allocation that crosses a slot boundary into at least a first PUSCH allocation in a first slot and a second PUSCH allocation in a second slot;
communicate with the network node according to the at least first PUSCH allocation and according to the at least second PUSCH allocation; and
determine a reference signal position of at least one reference signal corresponding to at least one of the at least first PUSCH allocation and the at least second PUSCH allocation, the reference signal position being based at least in part on:
a length of the first PUSCH allocation;
a length of the second PUSCH allocation; and
a Demodulation Reference Signal, DMRS, mapping type.

6. The WD of claim 5, further configured to receive an indication of a starting symbol, S, and a length, L, and wherein S plus L is permitted to be larger than 14.

7. The method of claim 1, wherein data to be communicated according to the first PUSCH allocation and data to be communicated according to the second PUSCH allocation correspond to the same transport block, TB.

8. The method of claim 1, wherein information bits of data communicated according to the first PUSCH allocation and of data communicated according to the second PUSCH allocation are encoded independently, wherein different redundancy versions are used for the data communicated according to the first PUSCH allocation and the data communicated according to the second PUSCH allocation.

9. The method of claim 8, wherein:
when the data communicated according to the first PUSCH allocation have a redundancy version of 0, the data communicated according to the second PUSCH allocation have a redundancy version of 2;
when the data communicated according to the first PUSCH allocation have a redundancy version of 2, the data communicated according to the second PUSCH allocation have a redundancy version of 3;
when the data communicated according to the first PUSCH allocation have a redundancy version of 3, the data communicated according to the second PUSCH allocation have a redundancy version of 1; and
when the data communicated according to the first PUSCH allocation have a redundancy version of 1, the data communicated according to the second PUSCH allocation have a redundancy version of 0.

10. The method of claim 3, wherein data to be communicated according to the first PUSCH allocation and data to be communicated according to the second PUSCH allocation correspond to the same transport block, TB.

11. The method of claim 3, wherein information bits of data communicated according to the first PUSCH allocation and of data communicated according to the second PUSCH allocation are encoded independently, wherein different redundancy versions are used for the data communicated according to the first PUSCH allocation and the data communicated according to the second PUSCH allocation.

12. The method of claim 11, wherein:
when the data communicated according to the first PUSCH allocation have a redundancy version of 0, the data communicated according to the second PUSCH allocation have a redundancy version of 2;
when the data communicated according to the first PUSCH allocation have a redundancy version of 2, the data communicated according to the second PUSCH allocation have a redundancy version of 3;
when the data communicated according to the first PUSCH allocation have a redundancy version of 3, the data communicated according to the second PUSCH allocation have a redundancy version of 1; and
when the data communicated according to the first PUSCH allocation have a redundancy version of 1, the data communicated according to the second PUSCH allocation have a redundancy version of 0.

13. The WD of claim 5, wherein data to be communicated according to the first PUSCH allocation and data to be communicated according to the second PUSCH allocation correspond to the same transport block, TB.

14. The WD of claim 5, wherein information bits of data communicated according to the first PUSCH allocation and of data communicated according to the second PUSCH allocation are encoded independently, wherein different redundancy versions are used for the data communicated according to the first PUSCH allocation and the data communicated according to the second PUSCH allocation.

15. The WD of claim 14, wherein:
when the data communicated according to the first PUSCH allocation have a redundancy version of 0, the data communicated according to the second PUSCH allocation have a redundancy version of 2;
when the data communicated according to the first PUSCH allocation have a redundancy version of 2, the data communicated according to the second PUSCH allocation have a redundancy version of 3;
when the data communicated according to the first PUSCH allocation have a redundancy version of 3, the data communicated according to the second PUSCH allocation have a redundancy version of 1; and
when the data communicated according to the first PUSCH allocation have a redundancy version of 1, the data communicated according to the second PUSCH allocation have a redundancy version of 0.

16. A network node configured to communicate with a wireless device, WD, the network node comprising processing circuitry, the processing circuitry configured to cause the network node to:
   indicate a splitting of an initial physical uplink shared channel, PUSCH, allocation that crosses a slot boundary into at least a first PUSCH allocation in a first slot and a second PUSCH allocation in a second slot; and
   communicate with the wireless device, WD, according to the at least first PUSCH allocation and the at least second PUSCH allocation; and
   determine a reference signal position of at least one reference signal corresponding to at least one of the at least first PUSCH allocation and the at least second PUSCH allocation, the reference signal position being based at least in part on:
      a length of the first PUSCH allocation;
      a length of the second PUSCH allocation; and
      a Demodulation Reference Signal, DMRS, mapping type.

17. The network node of claim 16, wherein the processing circuitry is further configured to indicate by being configured to cause the network node to indicate a starting symbol, S, and a length, L, wherein S plus L is permitted to be larger than 14.

18. The network node of claim 16, wherein data to be communicated according to the first PUSCH allocation and data to be communicated according to the second PUSCH allocation correspond to the same transport block, TB.

19. The network node of claim 16, wherein information bits of data communicated according to the first PUSCH allocation and of data communicated according to the second PUSCH allocation are encoded independently, wherein different redundancy versions are used for the data communicated according to the first PUSCH allocation and the data communicated according to the second PUSCH allocation.

20. The network node of claim 19, wherein:
   when the data communicated according to the first PUSCH allocation have a redundancy version of 0 the data communicated according to the second PUSCH allocation have a redundancy version of 2;
   when the data communicated according to the first PUSCH allocation have a redundancy version of 2 the data communicated according to the second PUSCH allocation have a redundancy version of 3;
   when the data communicated according to the first PUSCH allocation have a redundancy version of 3 the data communicated according to the second PUSCH allocation have a redundancy version of 1; and
   when the data communicated according to the first PUSCH allocation have a redundancy version of 1 the data communicated according to the second PUSCH allocation have a redundancy version of 0.

* * * * *